United States Patent
Carlson

[11] 3,788,497
[45] Jan. 29, 1974

[54] FLOW-THRU PALLETIZER AND DEPALLETIZER

[76] Inventor: Kenneth G. Carlson, 11350 N. Valley Dr. 18W, Mequon, Wis. 53092

[22] Filed: Sept. 27, 1972

[21] Appl. No.: 292,571

[52] U.S. Cl............. 214/6 P, 214/6 DK, 214/8.5 A, 214/8.5 F, 198/24, 198/35
[51] Int. Cl........................................... B65g 60/00
[58] Field of Search. 214/6 DK, 6 H, 6 P, 6 M, 6 N, 214/6.5, 8.5 R, 8.5 A, 8.5 F, 8.5 G; 198/35, 24

[56] References Cited
UNITED STATES PATENTS

| | | | |
|---|---|---|---|
| 3,430,784 | 3/1969 | Hall | 214/6 H |
| 3,442,401 | 5/1969 | Wolfe et al. | 214/6 P |
| 3,667,628 | 6/1972 | Gabler et al. | 214/6 P |

Primary Examiner—Robert J. Spar
Attorney, Agent, or Firm—Henry C. Fuller, Jr.

[57] ABSTRACT

A conveying system including two conveyors for conveying empty cans from a can making machine to a can filling machine includes palletizing and depalletizing apparatus located intermediate the conveyors to palletize cans when desired and depalletize cans to regulate flow between the machines. Empty cans are moved from one conveyor to another in patterned complements by a sweep bar to supply the requirements of the can filling machine. When the can filling machine is not in operation, patterned complements are sequentially deposited in layers on pallets. The pallets are stored on a storage conveyor associated with the pallet loading bin. When cans are required at the can filling machine and the can making machine is not in operation, the cans stored on the pallets are raised in the pallet loading bin with the layers of patterned cans swept from the pallet onto the conveyor for the can filling machine. The sweep bar assembly includes pattern forming dies for initiating a honeycomb pattern of cans flowing toward the sweep bar and a set of can engaging fingers spaced from the pattern forming bar which are operative to engage the rear rank of cans of the patterned can complement to maintain the cans in the pattern as the can complement is moved horizontally onto a retractable apron over the pallet loading bin.

8 Claims, 16 Drawing Figures

FLOW-THRU PALLETIZER AND DEPALLETIZER

BACKGROUND OF INVENTION

When a can making machine is located in the same plant or adjacent to the machine which fills the can, it is desirable to have both machines running continuously for maximum output at a minimum expense, with a continuous flow of cans from one machine to the other. However, various interruptions frequently occur in the operation, such as mechanical breakdowns, etc., of one machine requiring the other machine to be shut down. The present invention provides a conveyor system with a storage and supply capability located intermediate the can flow path between the machines which can be selectively employed if desired to regulate the flow of cans between the machines to obtain maximum production without delays caused by a shut down of one or the other machines.

SUMMARY OF INVENTION

The invention provides a conveying system for supplying empty cans to a can filling machine which is principally intended for use where the can making machine is in the same or an adjacent plant. The object of the conveying system is to provide a continuous supply of cans to the can filling machine when required and whether or not the can making machine is in operation. In this regard, a sweep bar and pattern forming assembly is associated with a pallet loading and unloading bin which is located between the supply conveyor which brings the cans from the can making machine and a second conveyor which conveys the cans to the can filling machine. The apparatus of the invention can be selectively operated to provide either a straight thru flow of patterned cans from the first conveyor to the second conveyor or to pattern the cans and store the patterned cans on pallets when the can filling machine is not in operation.

The pallet loading bin includes a pallet lift or pallet elevator with a retractable apron or slip sheet which bridges the gap between the two conveyors. The sweep bar and pattern forming assembly includes a row of pattern forming dies on the upstream side of the sweep bar for initiating the formation of a honeycombed pattern of cans, and a row of can engaging fingers to confine a pallet sized complement of patterned cans during movement of the can complement onto the retractable apron.

The sweep bar and pattern forming assembly is operable in two modes with the first mode intended for straight thru flow of patterned cans to the second conveyor, or for palletizing patterned layers of cans, and a second mode for depalletizing the patterned cans from pallets from the pallet loading bin onto the second conveyor which supplies the can filling machine. When the sweep bar and pattern forming assembly is used in the first mode, the assembly is moved horizontally from a position over the empty can supply conveyor or first conveyor in a first horizontal plane onto the retractable apron and then returned to the position over the first conveyor at an elevated horizontal plane to clear the patterned cans deposited on the retractable apron. As the cycle continues, the second complement of patterned cans is moved in the lower horizontal plane onto the retractable apron, with the sweep bar pushing the first complement of cans onto the second conveyor or take-away conveyor. Alternatively, the pallet elevator is lowered the height of one layer after the retractable apron is withdrawn to deposit the first layer of cans on a pallet. In the second mode, the sweep bar is reciprocated in a single horizontal plane to depalletize cans by successively sweeping the can layers from a pallet.

The apparatus of the invention enables independent operation of either the can making machine or the can filling machine if either of these machines is temporarily out of service.

Further objects, advantages, and features of the invention will become apparent from the following disclosure.

DRAWINGS

FIG. 3 is a fragmentary side elevational view of the pallet loading bin intermediate the supply and take-away conveyors.

FIG. 3-A is a sectional view taken along line 3–AA of FIG. 4.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
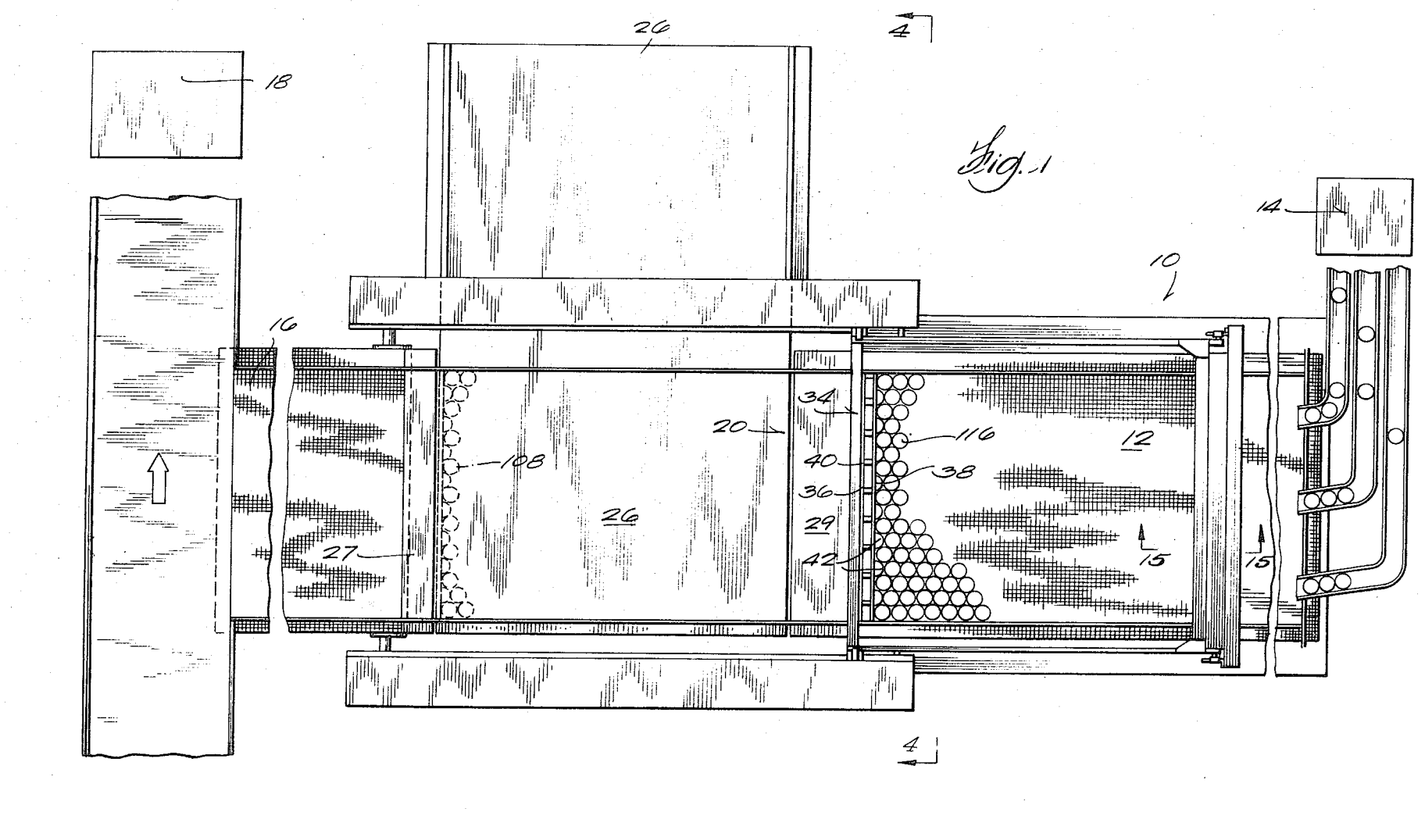
FIG. 1 is a schematic plan view of the conveying system of the invention.

In the drawings, FIG. 1 shows the conveying system of the invention 10 which includes a first conveyor, supply or accumulating conveyor 12 which receives cans from a can making machine 14 and a second conveyor or take-away conveyor 16 which delivers cans to the can filling machine 18. In accordance with the invention, a pallet loading bin 20 is located intermediate the adjacent ends of the conveyors 12 and 16. The pallet loading bin 10 is defined by members of a frame 22 (FIG. 3) having various vertical framing members. A retractable apron or slip sheet 26 is movable horizontally and transversely to the direction of can flow, between a position over the pallet loading bin and a retracted or withdrawn position free of the pallet loading bin. The apron 26 is located between dead plates 27 and 29. The pallet loading bin 20 also includes a pallet lift or pallet elevator 30 for raising and lowering pallets within the loading bin 20.

The invention provides a sweep bar and pattern forming assembly 34 which is hereinafter referred to as the sweep bar assembly 34. The sweep bar assembly 34 includes a horizontally extending bar 36 (FIGS. 1, 5) with a forward surface 38 which is adapted to engage and push cans from the retractable apron as hereinafter described, and a rear surface 40 (FIG. 5) which includes a plurality of pattern forming dies 42 of an appropriate size and spacing for the particular cans being conveyed. The sweep bar assembly 34 also includes a row of can engaging fingers 46 carried by a cross bar 48 (FIG. 5) which is supported on a pair of spaced arms 50 which are pivotally connected adjacent the other end to the frame of the sweep bar assembly 34. The arms 50 project rearwardly from the sweep bar over the conveyor 12, when the sweep bar assembly is in the can pattern forming position shown in FIG. 5.

Figure 6:
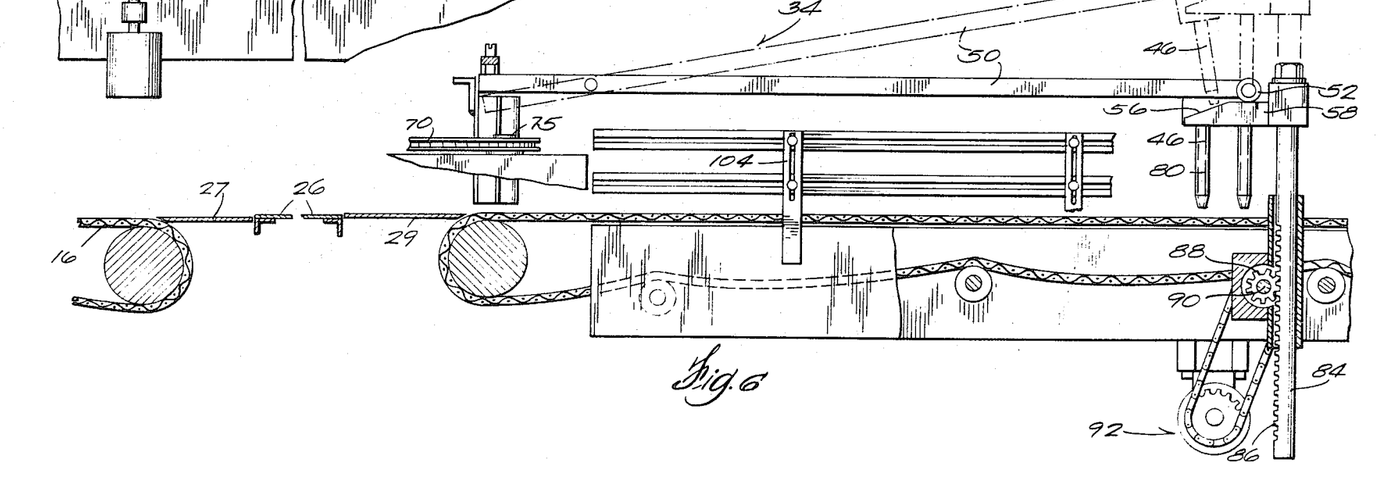
FIG. 6 is an enlarged fragmentary side elevational view with parts removed and broken away showing the sweep bar and pattern forming assembly with the sweep bar and pattern forming assembly fingers shown in full lines in an advanced can engaging position, and in broken lines in a retracted can clearing position.

Means are provided for moving the row of fingers 46 from an advanced position inserted within the cans as shown in full lines in FIG. 6, and a retracted clearance position above the cans and shown in broken lines in FIG. 6. The means includes two rollers 52 which are connected to the arms 50, which are interconnected by cross bar 48. The rollers 52 serve as cam followers to shift the fingers 46 to the retracted position upon engagement with a cam surface or ramp 56 on a bracket or frame portion 58, upon horizontal movement of the rollers 52 toward the ramp 56. The rollers 52 and ramp 56 serve to vertically align the fingers 46 with the fingers 80 subsequently described.

Figure 8:
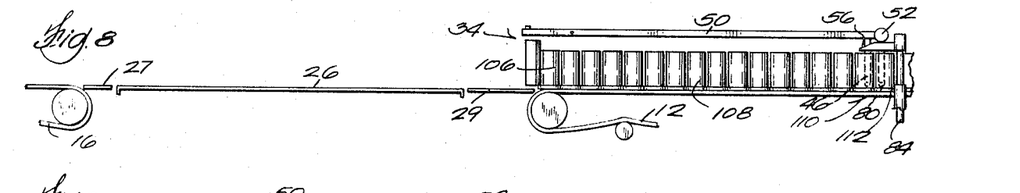
FIG. 8 is a diagrammatic view similar to FIG. 7 showing the completed pattern of cans with the fingers lowered onto cans in the rear ranks of the patterned can complement.
Figure 10:
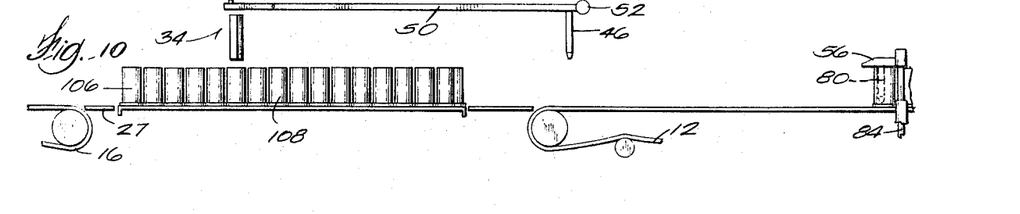
FIG. 10 is a view similar to FIG. 7 showing the can complement deposited on the retractable apron with the sweep bar and pattern forming assembly elevated for return movement to a position over the supply conveyor as shown in FIG. 7.

Means are also provided for elevating the sweep bar assembly 34 from the lower horizontal plane or position shown in FIG. 8 to the upper horizontal position shown in FIG. 10.

Figures 2, 15:
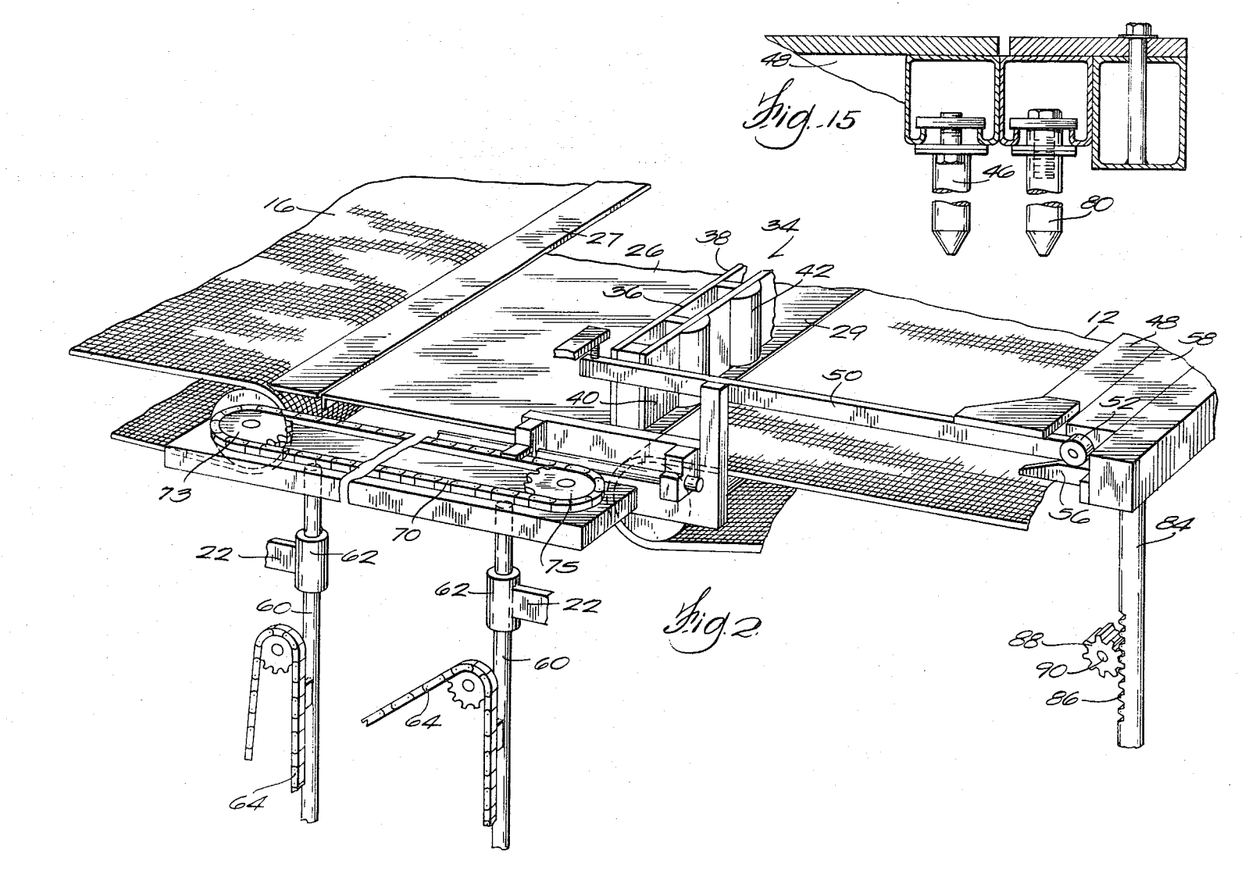
FIG. 2 is a fragmentary and diagrammatic perspective view of the sweep bar and pattern forming assembly.
FIG. 15 is an enlarged fragmentary sectional view taken along line 15—15 of FIG. 1.

In the disclosed construction, the means includes four posts 60 (FIGS. 2, 3) which are reciprocal vertically in sleeves 62 connected to the apparatus frame 22. An endless chain 64 on each side of the pallet loading bin is connected to two of the posts 60. The two chains 64 are driven by sprockets or pulleys 65 on a cross shaft 66 which is driven by a hydraulic motor 68.

Figure 4:
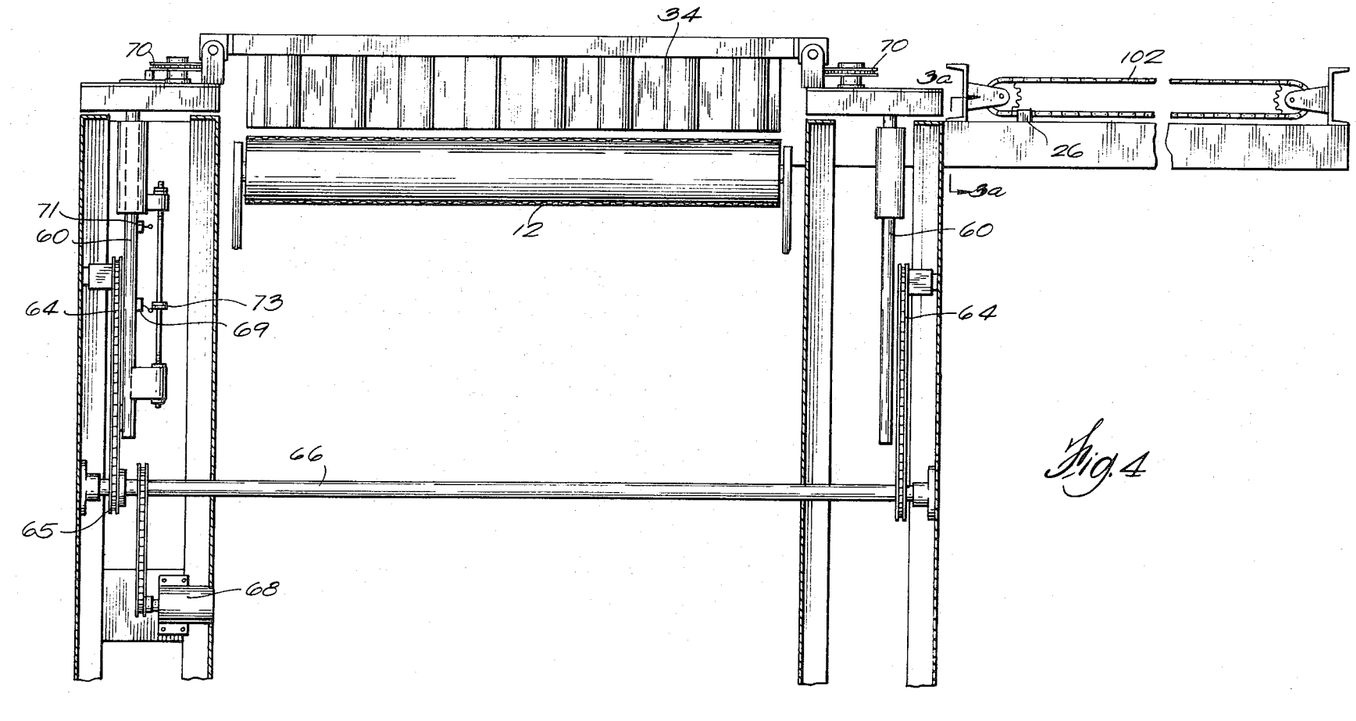
FIG. 4 is a view taken along line 4—4 of FIG. 1.

The vertical travel of the sweep bar assembly 34 is controlled by limit switches 69, 71 engageable with adjustable stop 73 (FIG. 4). The adjustable stop 73 affords adjustment for different size cans.

Figure 7:
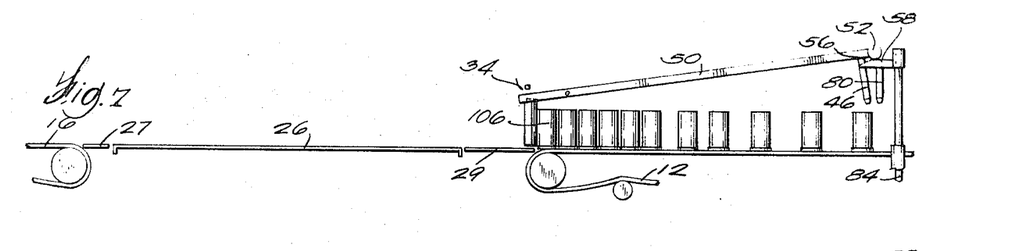
FIG. 7 is a diagrammatic side view showing the position of the sweep bar and pattern forming assembly during the step of forming the initial pattern of cans.
Figure 9:
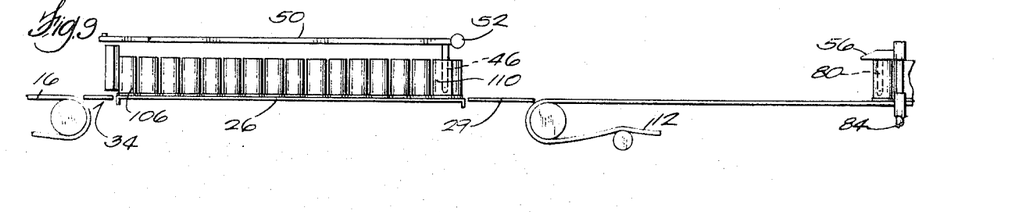
FIG. 9 is a view similar to FIG. 7 showing the complement of patterned cans moved onto the retractable apron over the pallet loading bin.

Means are also provided for shifting the sweep bar assembly 34 horizontally from the position shown in FIG. 7 over conveyor 12 to the position shown in FIG. 9 over the retractable apron 26 and over the mouth of the loading bin 20. As disclosed, the means includes a pair of spaced endless chains 70 (FIGS. 2, 5) which revolve about horizontal planes. The chains are arranged around sprockets 73, 75 which are rotatably supported on the frame. The chains 70 are driven by a hydraulic motor 76 and cross shaft.

Referring again to the apparatus for forming can patterns, the bracket 58 carries a row of depending fingers 80 which are employed to retain a rank or row 112 of cans during separation of a complement 108 of patterned cans from the can accumulation on the supply conveyor 12. Means are provided for raising and lowering the fingers 80. In the construction shown in FIG. 6, the means includes a pair of horizontally spaced columns 84 with a toothed surface 86 which serves as a rack which is driven by pinions 88 carried on a cross shaft 90 which is driven by a hydraulic motor and chain and sprocket assembly 92. The function of the fingers 80 is subsequently described in detail.

The pallet elevator 30 includes a pair of pallet supporting bars 94 with the ends of each pallet bar being connected to spaced endless chains 96 which are located on each side of the pallet elevator. The two sets of endless chains 96 are driven by a hydraulic motor 98 through a chain and sprocket drive arrangement 100. An empty pallet conveyor 101 delivers empty pallets to the pallet elevator 30 and a loaded pallet conveyor 103 stores pallets containing layers of cans.

Figures 3, 3A:
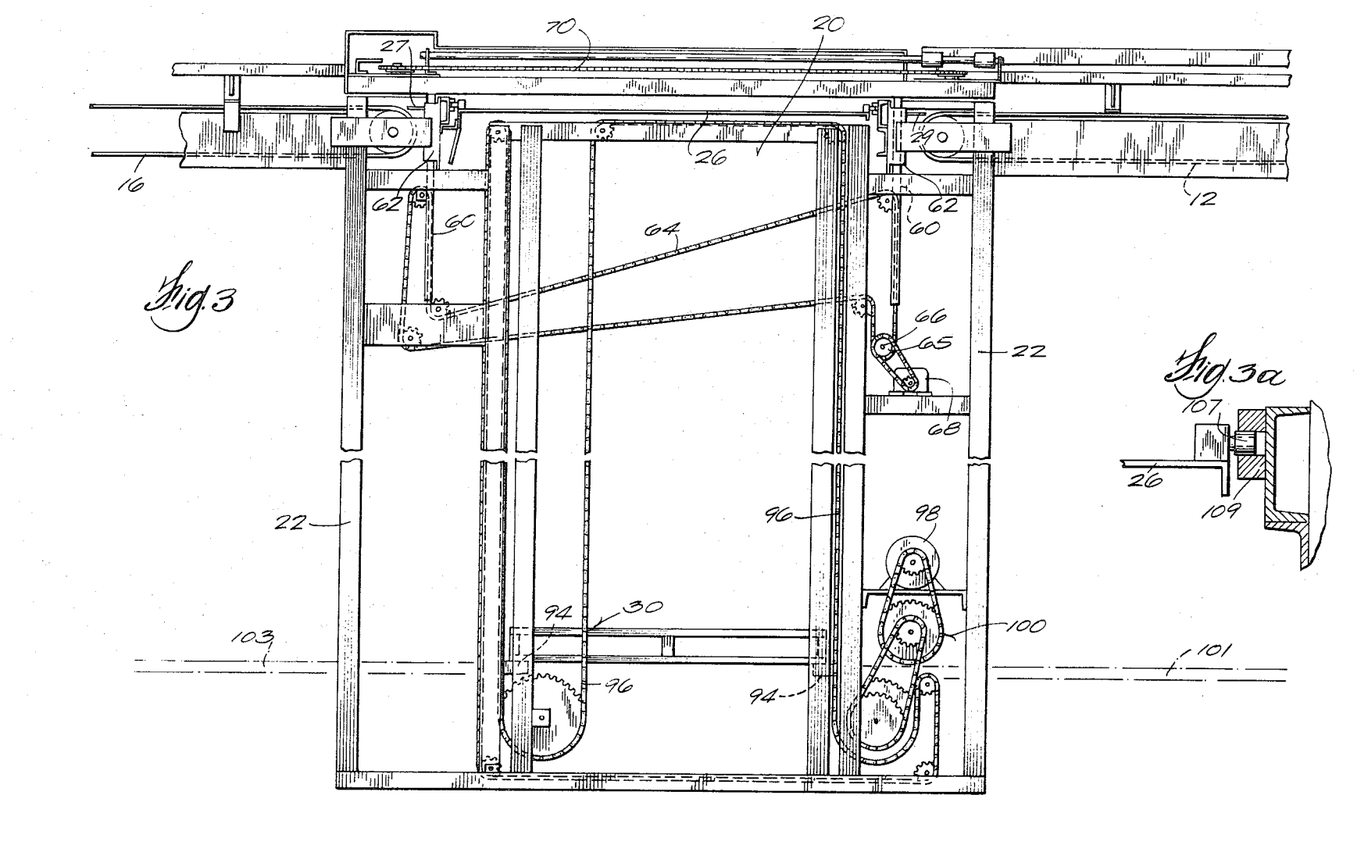

The retractable apron or slip sheet 26 is connected to an endless chain 102 (FIG. 4) which is driven by a hydraulic motor (not shown). The apron is guided by rollers 107 in tracks 109. (FIG. 3A)

The supply conveyor 12 is also provided with laterally adjustable side guide rails 104.

Figure 5:
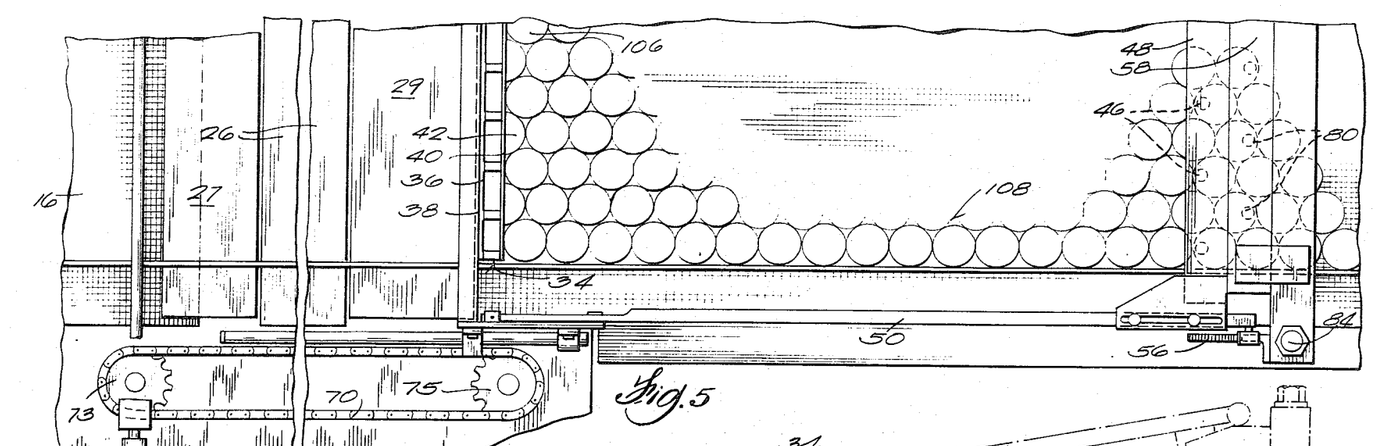
FIG. 5 is an enlarged fragmentary plan view showing the pattern forming dies and the formation of a pattern of cans on the supply conveyor.

In operation of the apparatus of the invention and when it is desired to provide a straight thru flow of cans from the supply conveyor 12 to the take-away conveyor 16, as for instance, where the can filling machine and can making machine are both operative and the requirements of the can filling machine are equal to the output of patterned cans, the pattern bar assembly 34 is positioned as shown in FIG. 7 over the forward end of the conveyor 12 with the fingers 46 and 80 in an elevated position. The elevated position of the fingers 46 and 80 is caused by energizing the motor drive assembly 92 to raise the columns 84 which thus lift the arms 50 as well as the fingers 80. With the sweep bar assembly 34 in the FIG. 7 position, cans are delivered to the supply conveyor 12 with the formation of a honeycomb pattern developing as shown in FIG. 5 as the cans carried by the mesh conveyor belt 12 engage the dies 42. The pattern continues to form as cans move toward the dies 42 and shift and skid on the mesh belt. When a pallet sized complement 108 of cans has been completed on the belt 12, the fingers 46 and 80 are lowered into engagement with the rear ranks of cans 110 and 112 by reversing the direction of rotation of the hydraulic motor and drive assembly 92. The hydraulic motor 76 is then energized to move the pattern bar assembly 34 horizontally over the retractable apron 26 into the position shown in FIG. 9. During movement from conveyor 12 onto the retractable apron 26, the fingers 46 which are engaged in the row 110 of cans, confine the cans in the complement 108 to maintain the cans in the honeycomb pattern. The fingers 80 maintain the rear rank of cans 112 in an arrested condition while the can complement 108 is separated from the can accumulation on the conveyor 12.

Once the can complement 108 has been shifted onto the retractable apron 26, the machine operator makes a decision as to whether the can complement 108 should be moved onto the take-away conveyor 16 or stored on a pallet. The decision will be based on whether or not additional cans are required by the can filling machine.

Figure 13:
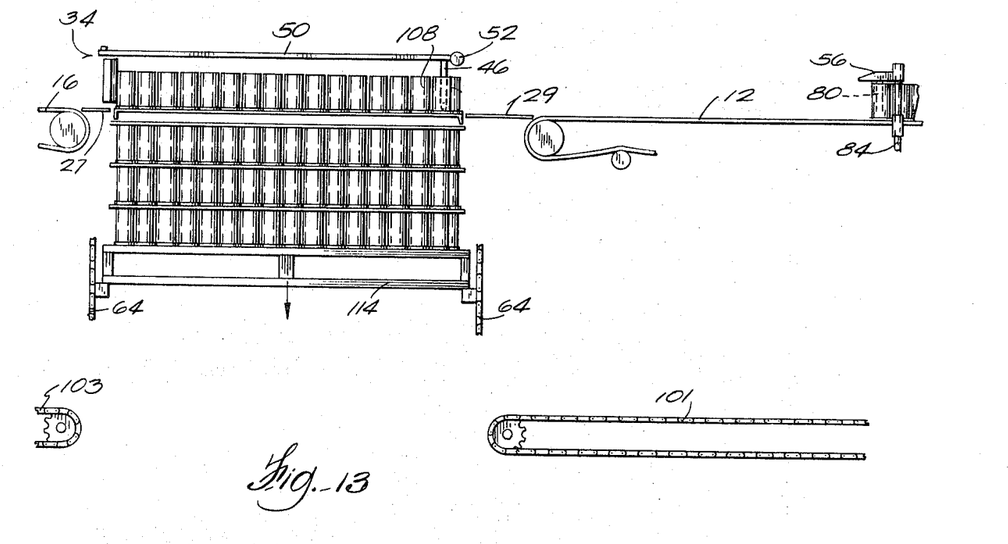
FIG. 13 is a diagrammatic view showing the deposit of layers of patterned cans onto pallets for temporary storage.

FIG. 10 shows the pattern bar assembly retracted upwardly by energization of a hydraulic motor 68 to afford clearance of the pattern bar assembly 34 over the can complement 108 for return of the pattern bar assembly 34 to the first supply conveyor 12. Once the pattern bar assembly 34 is over the conveyor 12, it is lowered to the position shown in FIG. 8 and the columns 84 elevated to position the pattern bar assembly as shown in FIG. 7. If the machine operator decides to palletize the can complement 108, the retractable apron 26 is withdrawn and the can complement 108 is deposited on a pallet 114 delivered to the pallet lift by conveyor 101. (FIG. 13) When the pallet 114 is filled, it is stored on the storage conveyor 103. The retractable apron 26 is successively positioned over the pallet bin and withdrawn as the patterned can complements are moved to the pallet loading bin.

Figure 11:
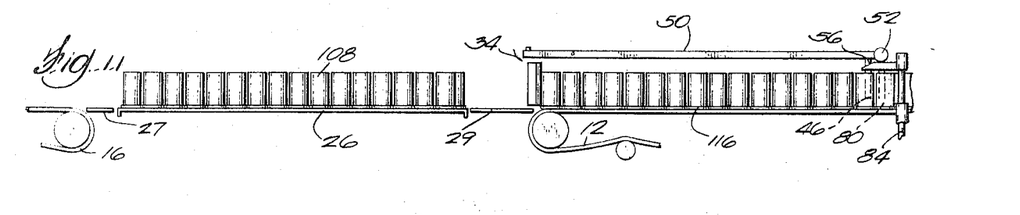
FIG. 11 is a view similar to FIG. 7 showing the sweep bar and pattern forming assembly lowered to develop and confine a second complement of patterned cans.
Figure 12:
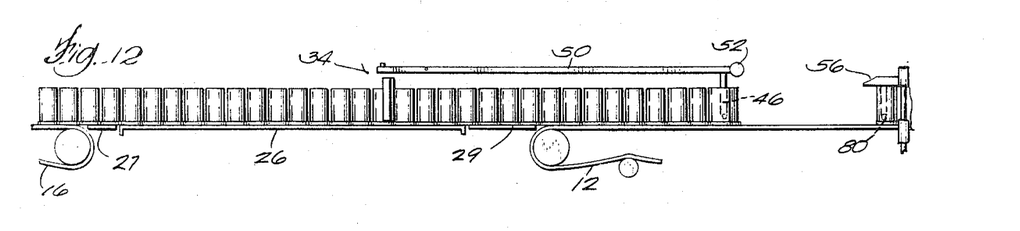
FIG. 12 is a view similar to FIG. 7 showing the second complement of patterned cans in movement horizontally onto the retractable apron with the sweep bar pushing the first complement of patterned cans onto the take-away conveyor.

If the operator intends to move the can complement 108 onto the take-away conveyor 16, the complement 108 remains on the apron 26 and the fingers 46 and 80 are lowered, and a second complement of patterned cans 116 (FIG. 11) is moved horizontally over the retractable apron 26 with the forward surface of the sweep bar 38 pushing the can complement 108 onto the take-away conveyor 16 (FIG. 12).

Figure 14:
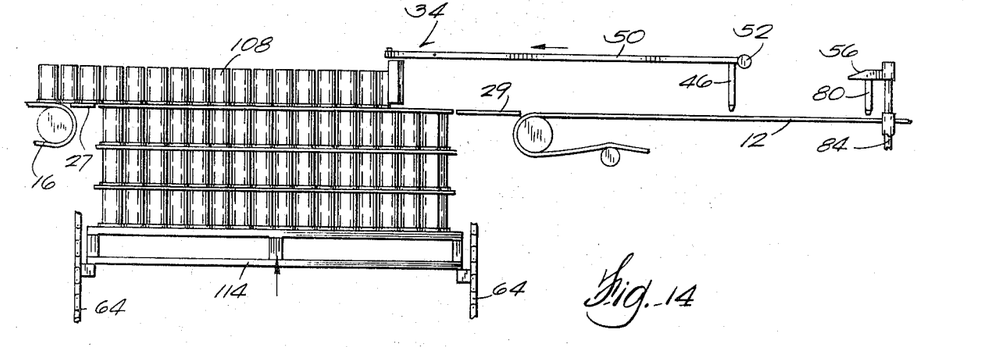
FIG. 14 is a diagrammatic side elevational view showing the depalletizing of cans by horizontal movement of the sweep bar.

In FIG. 14 the depalletizing sequence is shown. In the event cans are not being supplied by the can making machine, or the operator decides to unload some pallets, the retractable apron is withdrawn and the pallet elevator raised with a full pallet to position the top layer of cans at the height of the take-away conveyor 16. The sweep bar assembly 34 is then actuated to move horizontally and sweep the can complement 108 onto the take-away conveyor 16. The sweep bar assembly 34 is then shifted horizontally at the same height as shown at FIG. 14 to enable a pallet elevator to raise the next layer of cans level with the conveyor 16. The successive layers of cans can then be swept onto the take-away conveyor 16.

What is claimed is:

1. In conveying apparatus having a first conveyor and a second conveyor the improvement comprising apparatus located intermediate said first and second conveyors for palletizing and depalletizing cans comprising a frame defining a pallet loading and unloading bin located intermediate the ends of said conveyors, a pallet lift vertically reciprocable in said loading bin, a sweep bar and pattern forming assembly, a retractable apron over said pallet loading bin and means for moving said sweep bar and pattern forming assembly in first and second modes with said sweep bar being operable in said first mode for movement from a position over said first conveyor to a position over said loading bin in a first horizontal plane with return movement of said sweep bar to the position over the first conveyor in a second horizontal plane vertically above said first horizontal plane to move cans from said first conveyor to said retractable apron and for reciprocable movement in said second mode in a single horizontal plane over said pallet loading bin to sweep successive layers of cans from a pallet carried by said pallet lift.

2. The improvmement of claim 1 wherein said sweep bar and pattern forming assembly includes a pattern forming bar having semi-cylindrical dies for initiating a honeycomb pattern of cans carried by said first conveyor and engaging said dies, a frame connected to said pattern forming bar, a first set of can engaging fingers supported on said frame and spaced from said dies to define a can complement of a size adapted for a pallet, means for moving said fingers between advanced and retracted positions with said fingers adapted to engage and confine the rear rank of cans in said can complement during movement of said can complement onto said retractable apron, and means for moving said sweep bar and pattern forming assembly horizontally between said first position and said second position over said retractable apron and vertically upward for return from said second position to said first position in said second horizontal plane.

3. The improvement of claim 2 including a second set of can engaging fingers, a frame supporting said second set of reciprocating fingers, reciproacting means for reciprocating said fingers vertically and wherein said means for moving said first set of retractable fingers between retracted and advanced positions comprises swing arms pivotally connected at one end to said sweep bar and pattern forming assembly, said fingers being connected adjacent the other end of said swing arms and a cam surface on said frame carrying said vertically reciprocable fingers, and a cam follower on said swing arm so that movement of said pattern bar assembly horizontally towards said second finger frame causes upward displacement of said first set of fingers with both sets of fingers being movable in unison vertically upwardly and downwardly upon actuation of said reciprocating means.

4. The improvement of claim 2 wherein said means for moving said sweep bar and pattern forming assembly horizontally includes endless chains located on each side of said pallet loading bin and extending longitudinally from said conveyors, said chains being operable in a horizontal plane and said sweep bar being connected to said spaced chains and means for driving said chains.

5. The improvement of claim 2 wherein said means for moving said sweep bar assembly vertically includes posts at the corners of said sweep bar and pattern forming assembly, sleeves on said frame for guiding vertical reciprocal movement of said posts and endless chains on opposite sides of said pallet bin, said chains being connected to said posts and means for driving said chains.

6. Apparatus for palletizing and depalletizing cans comprising first and second spaced conveyors, a frame defining a pallet loading and unloading bin located intermediate the ends of said conveyors, a pallet lift in said loading bin, means for raising and lowering said pallet lift, a sweep bar and pattern forming assembly, means for moving said sweep bar and pattern forming assembly in a first horizontal plane between a first position with parts over said first conveyor and a second position over said pallet loading bin, a retractable apron over said pallet loading bin, means for raising said sweep bar and pattern forming assembly above said first horizontal plane for return movement of said assembly to said first position in a second horizontal plane above said first horizontal plane.

7. Apparatus in accordance with claim 6 wherein said sweep bar and pattern forming assembly includes a horizontally extending bar transverse to the path of movement of cans on said first and second conveyors, the forward surface of said bar being adapted to sweep cans from said retractable apron onto said second conveyor, the opposite side of said bar having pattern forming dies spaced to initiate formation of a honeycomb pattern of cans on said first conveyor, arms pivotally connected to said sweep bar assembly and extending rearwardly of said assembly and over said first conveyor, when said assembly is in the first position, said arms having a first row of fingers adapted to engage a transverse row of cans to define the rear rank of cans in a pallet-sized can complement.

8. Apparatus in accordance with claim 7 including a second row of fingers, a frame member supporting said fingers, and means for raising and lowering said frame and said first and second rows of fingers to move said fingers within cans on said first conveyor retaining a row of cans adjacent the rear of said patterned can complement against movement during separation of the patterned pallet-sized complement from an accumulation of cans on said first conveyor and during moving of said can complement onto said retractable apron.

* * * * *